(12) United States Patent
Nagai et al.

(10) Patent No.: US 10,011,521 B2
(45) Date of Patent: Jul. 3, 2018

(54) COLORED GLASS PLATE AND METHOD FOR MANUFACTURING SAME

(71) Applicant: Asahi Glass Company, Limited, Chiyoda-ku (JP)

(72) Inventors: Kensuke Nagai, Chiyoda-ku (JP); Yuya Shimada, Chiyoda-ku (JP); Yusuke Arai, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/290,090

(22) Filed: Oct. 11, 2016

(65) Prior Publication Data

US 2017/0029320 A1    Feb. 2, 2017

Related U.S. Application Data

(63) Continuation of application No. PCT/JP2015/062389, filed on Apr. 23, 2015.

(30) Foreign Application Priority Data

Apr. 23, 2014    (JP) .................................. 2014-089595

(51) Int. Cl.
| | | |
|---|---|---|
| *C03C 3/087* | (2006.01) | |
| *C03C 3/095* | (2006.01) | |
| *C03C 4/02* | (2006.01) | |
| *C03C 3/062* | (2006.01) | |
| *C03C 3/064* | (2006.01) | |
| *C03C 3/078* | (2006.01) | |
| *C03C 3/083* | (2006.01) | |
| *C03C 3/085* | (2006.01) | |
| *C03C 3/089* | (2006.01) | |
| *C03C 3/091* | (2006.01) | |
| *C03C 4/08* | (2006.01) | |
| *C03B 19/02* | (2006.01) | |

(52) U.S. Cl.
CPC .............. *C03C 3/095* (2013.01); *C03C 3/062* (2013.01); *C03C 3/064* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 4/02* (2013.01); *C03C 4/08* (2013.01); *C03B 19/02* (2013.01)

(58) Field of Classification Search
CPC ........... C03C 3/087; C03C 3/095; C03C 4/02; C03B 19/02
See application file for complete search history.

(56) References Cited

U.S. PATENT DOCUMENTS

| 5,013,487 | A | 5/1991 | Cheng |
| 5,069,826 | A | 12/1991 | Cheng |
| 6,673,730 | B1 | 1/2004 | Shelestak |
| 2009/0000335 | A1* | 1/2009 | Urata .................... C03B 5/2252 65/134.2 |
| 2009/0325776 | A1 | 12/2009 | Murata |
| 2012/0202677 | A1 | 8/2012 | Shimada et al. |
| 2012/0289394 | A1 | 11/2012 | Nagai et al. |
| 2013/0306900 | A1 | 11/2013 | Shimada et al. |

FOREIGN PATENT DOCUMENTS

| JP | 4-502304 | 4/1992 | |
| JP | 2002-348143 | 12/2002 | |
| JP | 2006265001 A * | 10/2006 | ............. C03C 3/091 |
| JP | 2010202413 A * | 9/2010 | ............. C03C 1/026 |
| WO | WO 2007/125713 A1 | 11/2007 | |
| WO | WO-2009001586 A1 * | 12/2008 | ............. C03C 1/026 |
| WO | WO 2011/093284 A1 | 8/2011 | |
| WO | WO 2012/102176 A1 | 8/2012 | |

OTHER PUBLICATIONS

International Search Report dated Jul. 21, 2015 in PCT/JP2015/062389 filed on Apr. 23, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a colored glass plate of which the mass ratio of divalent iron as calculated as $Fe_2O_3$ to total iron as calculated as $Fe_2O_3$ can be stably maintained at a high level while amber coloring derived from salt cake ($Na_2SO_4$) is suppressed by reducing the amount of salt cake used as a refining agent, and which has less bubbles regardless of a small amount of total sulfur as calculated as $SO_3$. A colored glass plate which is made of alkali-containing silica glass containing iron, tin and sulfur, wherein, as represented by mass % based on oxides, the proportion of total sulfur as calculated as $SO_3$ is less than 0.025%, the proportion of divalent iron as calculated as $Fe_2O_3$ to total iron as calculated as $Fe_2O_3$ is at least 45%, the proportion of divalent tin as calculated as $SnO_2$ to total tin as calculated as $SnO_2$ is at least 0.1% as represented by mol %, and β-OH is at least 0.15 $mm^{-1}$.

20 Claims, No Drawings

COLORED GLASS PLATE AND METHOD FOR MANUFACTURING SAME

TECHNICAL FIELD

The present invention relates to a colored glass plate and a process for its production.

BACKGROUND ART

As a colored glass plate, a heat-absorbing glass plate for automobiles made of alkali-containing silica glass which contains iron as a coloring component and which thereby provides a blue or green transmitted light, etc., have been known (Patent Documents 1 to 4).

PRIOR ART DOCUMENTS

Patent Documents

Patent Document 1: JP-A-2002-348143
Patent Document 2: U.S. Pat. No. 6,673,730
Patent Document 3: WO2007/125713
Patent Document 4: WO2011/093284

DISCLOSURE OF INVENTION

Technical Problem

Iron in glass is present as divalent or trivalent iron, and divalent iron has an absorption peak at a wavelength in the vicinity of 1,100 nm and trivalent iron has an absorption peak at a wavelength in the vicinity of 400 nm. Accordingly, in order to provide a blue or green transmitted light, it is preferred to increase the mass ratio of divalent iron as calculated as $Fe_2O_3$ to total iron as calculated as $Fe_2O_3$ (hereinafter referred to as Fe-Redox).

Further, a colored glass plate made of silica glass containing an alkali contains sulfur derived from salt cake ($Na_2SO_4$) contained as a refining agent in the glass raw material.

In a case where salt cake ($Na_2SO_4$) is used, the larger its amount, the higher the refining effect and the easier bubbles at the time of melting the glass can be removed. However, sulfur derived from salt cake is present as negative divalent or hexavalent sulfur in the glass, and negative divalent sulfur is amber-colored with intense absorption at a wavelength in the vicinity of 380 nm and hexavalent sulfur is colorless. Accordingly, in order to obtain a colored glass plate which provides a transmitted light with a desired color, it is preferred to reduce the amount of sulfur as far as possible and to suppress formation of negative divalent sulfur (amber coloring) as far as possible. However, if the amount of sulfur is small, the refining effect tends to be small, and bubbles at the time of melting the glass can hardly be removed.

By the way, in order to increase Fe-Redox, it is required to add a reducing agent (such as coke) in a large amount to the glass raw material. However, when trivalent iron is reduced to divalent iron by the reducing agent, hexavalent sulfur is also reduced to negative divalent sulfur by the reducing agent, and amber coloring tends to be remarkable. Accordingly, it is difficult to achieve Fe-Redox of at least 45% while amber coloring is suppressed.

The present invention provides a colored glass plate of which the mass ratio of divalent iron as calculated as $Fe_2O_3$ to total iron as calculated as $Fe_2O_3$ is stably maintained at a high level while amber coloring derived from salt cake ($Na_2SO_4$) is suppressed by reducing the amount of salt cake used as a refining agent, and which has less bubbles regardless of a small amount of total sulfur as calculated as $SO_3$.

Solution to Problem

The colored glass plate of the present invention is characterized by made of alkali-containing silica glass containing iron, tin and sulfur, wherein, as represented by mass % based on oxides, the proportion of total sulfur as calculated as $SO_3$ is less than 0.025%, the proportion of divalent iron as calculated as $Fe_2O_3$ to total iron as calculated as $Fe_2O_3$ is at least 45%, the proportion of divalent tin as calculated as $SnO_2$ to total tin as calculated as $SnO_2$ is at least 0.1% as represented by mol %, and β-OH is at least 0.15 $m^{-1}$.

The colored glass plate of the present invention is preferably such that the proportion of divalent tin as calculated as $SnO_2$ to total tin as calculated as $SnO_2$ is from 0.2 to 40% as represented by mol %.

The colored glass plate of the present invention is preferably such that 443−420×β-OH ($mm^{-1}$)−4.8×Fe-redox (%) is less than 100.

The colored glass plate of the present invention may be such that the proportion of divalent iron as calculated as $Fe_2O_3$ to total iron as calculated as $Fe_2O_3$ is at least 55%.

The colored glass plate of the present invention may contain, as represented by mass % based on oxides:

| | |
|---|---|
| $SiO_2$ | 30 to 80%, |
| $Al_2O_3$ | 0 to 30% |
| $B_2O_3$ | 0 to 20%, |
| MgO | 0 to 30%, |
| CaO | 0 to 30%, |
| $Na_2O$ | 0.5 to 50%, |
| $K_2O$ | 0 to 50%, |
| total iron as calculated as $Fe_2O_3$ | 0.001 to 5%, and |
| total tin as calculated as $SnO_2$ | 0.001 to 5%. |

Further, the colored glass plate of the present invention may contain, as represented by mass % based on oxides:

| | |
|---|---|
| $SiO_2$ | 65 to 73%, |
| $Al_2O_3$ | 3 to 5% |
| $B_2O_3$ | 0 to 1%, |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.1 to 0.9%, and |
| total tin as calculated as $SnO_2$ | 0.02 to 0.3%. |

Further, the colored glass plate of the present invention may contain substantially no $B_2O_3$ and contain, as represented by mass % based on oxides:

| | |
|---|---|
| $SiO_2$ | 65 to 73%, |
| $Al_2O_3$ | 3 to 5% |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.3 to 0.9%, and |
| total tin as calculated as $SnO_2$ | 0.02 to 0.3%. |

Further, the colored glass plate of the present invention may contain, as represented by mass % based on oxides:

| | |
|---|---|
| SiO$_2$ | 65 to 75%, |
| Al$_2$O$_3$ | 0 to 3% |
| B$_2$O$_3$ | 0 to 1%, |
| MgO | 2 to 5%, |
| CaO | 7 to 10%, |
| Na$_2$O | 11 to 15%, |
| K$_2$O | 0 to 5%, |
| total iron as calculated as Fe$_2$O$_3$ | 0.1 to 0.9%, and |
| total tin as calculated as SnO$_2$ | 0.02 to 0.3%. |

The colored glass plate of the present invention may be such that the proportion of total sulfur as calculated as SO$_3$ as represented by mass % based on oxides is at least 0.01% and less than 0.02%.

The colored glass plate of the present invention may contain substantially no TiO$_2$, for the purpose of adjusting the color of transmitted light, particularly in order to obtain a blue glass plate.

The colored glass plate of the present invention may contain TiO$_2$ in a content of at most 3.0% as represented by mass % based on oxides, for the purpose of adjusting the color of the transmitted light, particularly in order to obtain a green glass plate.

The colored glass plate of the present invention may be such that the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 1.3.

The colored glass plate of the present invention may be such that the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 1.85.

The colored glass plate of the present invention may be such that the solar transmittance Te is at most 65% calculated as 4 mm thickness of the glass plate as defined in JIS R3106 (1998), and the visible light transmittance Tv (by illuminant A, 2° visual field) is at least 60% calculated as 4 mm thickness of the glass plate as defined in JIS R3106 (1998).

The process for producing a colored glass plate of the present invention is characterized by obtaining a colored glass plate containing iron, tin and sulfur, wherein, as represented by mass % based on oxides, the proportion of total sulfur as calculated as SO$_3$ is less than 0.025%, the proportion of divalent iron as calculated as Fe$_2$O$_3$ to total iron as calculated as Fe$_2$O$_3$ is at least 45%, the proportion of divalent tin as calculated as SnO$_2$ to total tin as calculated as SnO$_2$ is at least 0.1% as represented by mol %, and β-OH is at least 0.15 mm$^{-1}$.

The expression "to" defining the above numerical range is used to include the numerical values before and after it as the lower limit value and the upper limit value, and hereinafter in this specification, "to" is used to have the same meaning unless otherwise specified.

Advantageous Effects of Invention

According to the present invention, it is possible to obtain a colored glass plate of which the mass ratio of divalent iron as calculated as Fe$_2$O$_3$ to total iron as calculated as Fe$_2$O$_3$ can be stably maintained at a high level while amber coloring derived from salt cake (Na$_2$SO$_4$) is suppressed by reducing the amount of salt cake used as a refining agent, and which has less bubbles regardless of a small amount of total sulfur as calculated as SO$_3$.

DESCRIPTION OF EMBODIMENTS

Now, an embodiment of the present invention will be described.

The colored glass plate according to one embodiment of the present invention is characterized in that Fe-Redox can be stably maintained at a high level while amber coloring derived from salt cake (Na$_2$SO$_4$) is suppressed by reducing the amount of salt cake used as a refining agent, by incorporating tin in alkali-containing silica glass (such as soda lime silica glass) containing iron and sulfur and by adjusting the proportion of divalent tin as calculated as SnO$_2$ to total tin as calculated as SnO$_2$ (as represented by mol %) (hereinafter referred to as Sn-Redox) to be a predetermined proportion or higher, and bubbles are small regardless of a small amount of total sulfur as calculated as SO$_3$ by adjusting β-OH as an index showing the water content in the glass plate to be predetermined value.

Iron in the glass is present as divalent or trivalent iron, and divalent iron has an absorption peak at a wavelength in the vicinity of 1,100 nm and trivalent iron has an absorption peak at a wavelength in the vicinity of 400 nm. Accordingly, in order to provide a blue or green transmitted light, the glass preferably has no absorption at a wavelength in the vicinity of 400 nm, and it is necessary to increase Fe-Redox.

Further, since divalent iron has an absorption peak at a wavelength in the vicinity of 1,100 nm, it lowers the transmittance for heat which is transmitted through the colored glass plate (hereinafter referred to as Te). To increase Fe-Redox is preferred also in view of Te, and the value of Fe-Redox is preferably at least 45%.

The value of Te on that occasion is preferably at most 65% calculated as 4 mm thickness of the glass plate, preferably at most 50%, more preferably at most 45%, further preferably at most 40%, particularly preferably at most 35%.

Fe-Redox in the colored glass plate according to the present embodiment is at least 45%. When Fe-Redox is at least 45%, Te can be kept low. On the other hand, if Fe-Redox is too high, amber coloring occurs by formation of negative divalent sulfur by reduction of hexavalent sulfur. Fe-Redox is preferably at least 55%, preferably from 55 to 90%, more preferably from 58 to 80%, particularly preferably from 60 to 70%.

Tin in the glass is present as divalent or tetravalent tin, and divalent tin functions as a reducing agent for iron at low Fe-Redox (for example, less than 45%) and tetravalent tin functions as a reducing agent for iron at high Fe-Redox (for example, higher than 90%). Further, reduction of tin by a reducing agent such as coke occurs in priority to reduction of sulfur, and accordingly formation of negative divalent sulfur is suppressed even at Fe-Redox of at least 45%. As described above, tin functions as a buffering agent for oxidation-reduction reaction of iron and sulfur. Accordingly, it is preferred to increase Sn-Redox in order to stably maintain Fe-Redox at a high level while suppressing amber coloring.

Sn-Redox of the colored glass plate according to the present embodiment is at least 0.1%, preferably from 0.1 to 50%. When Sn-Redox is at least 0.1%, Fe-Redox can be stably maintained at a high level while amber coloring is suppressed. When Sn-Redox is at most 50%, reduction of hexavalent sulfur by divalent tin in excess can be suppressed, and amber coloring by formation of negative divalent sulfur can be suppressed. Sn-Redox is preferably from 0.2 to 40%, more preferably from 1 to 40%, further preferably from 2 to 30%, particularly preferably from 3 to 10%.

β-OH as an index showing the water content in the colored glass plate of the present invention, is preferably at least 0.15 mm$^{-1}$. Here, β-OH is a value obtained by the following formula.

$$\beta\text{-OH (mm}^{-1}) = -\log_{10}(T_{3500}\text{ cm}^{-1}/T_{4000}\text{ cm}^{-1})/t$$

In the above formula, $T_{3500}$ cm$^{-1}$ is a transmittance (%) at a wave number of 3,500 cm$^{-1}$, $T_{4000}$ cm$^{-1}$ is a transmittance (%) at a wave number of 4,000 cm$^{-1}$, and t is the thickness (mm) of the glass plate.

By adjusting β-OH of the colored glass plate according to the present embodiment to be at least 0.15 mm$^{-1}$, the refining ability can be improved, and the temperature in the bending step can be decreased. β-OH is preferably from 0.15 to 0.45 mm$^{-1}$, more preferably from 0.20 to 0.35 mm$^{-1}$, further preferably from 0.23 to 0.30 mm$^-$, particularly preferably from 0.25 to 0.28 mm$^{-1}$.

The present inventors have further found that bubbles at the time of melting the glass can easily be removed from glass containing tin when "index to number of bubbles in glass plate" in accordance with the following formula is less than 100, by putting a glass raw material containing tin in a volume of 3.6 m×1.4 m×0.65 m into a glass melting furnace capable of preparing 3 ton/day of glass, burning the raw material by a gas oxygen burner to prepare glass, calculating Fe-Redox and β-OH of the prepared glass and counting the number of bubbles.

Index to number of bubbles in glass plate=443−420×
β-OH (mm$^{-1}$)−4.8×Fe-Redox (%)

This index is preferably less than 100, more preferably less than 50, further preferably less than 40, particularly preferably less than 30.

As a means to increase β-OH, burning in the glass melting furnace may be conducted by oxygen burning not by air burning, water vapor is blown into the glass melt in the glass melting furnace. By such a means, β-OH can be made to be at least 0.15 mm$^{-1}$.

The colored glass plate according to the present embodiment is preferably made of alkali-containing silica glass having the following composition, as represented by mass % based on oxides:

| | |
|---|---|
| $SiO_2$ | 30 to 80%, |
| $Al_2O_3$ | 0 to 30% |
| $B_2O_3$ | 0 to 20%, |
| MgO | 0 to 30%, |
| CaO | 0 to 30%, |
| $Na_2O$ | 0.5 to 50%, |
| $K_2O$ | 0 to 50%, |
| total iron as calculated as $Fe_2O_3$ | 0.001 to 5%, and |
| total tin as calculated as $SnO_2$ | 0.001 to 5%. |

It preferably contains, as represented by mass % based on oxides:

| | |
|---|---|
| $SiO_2$ | 65 to 73%, |
| $Al_2O_3$ | 3 to 5% |
| $B_2O_3$ | 0 to 1%, |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.1 to 0.9%, preferably 0.3 to 0.9%, and |
| total tin as calculated as $SnO_2$ | 0.02 to 0.3%. |

It preferably contains substantially no $B_2O_3$ and contains, as represented by mass % based on oxides:

| | |
|---|---|
| $SiO_2$ | 65 to 73%, |
| $Al_2O_3$ | 3 to 5% |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.3 to 0.9%, and |
| total tin as calculated as $SnO_2$ | 0.02 to 0.3%. |

It preferably contains, as represented by mass % based on oxides:

| | |
|---|---|
| $SiO_2$ | 65 to 75%, |
| $Al_2O_3$ | 0 to 3% |
| $B_2O_3$ | 0 to 1%, |
| MgO | 2 to 5%, |
| CaO | 7 to 10%, |
| $Na_2O$ | 11 to 15%, |
| $K_2O$ | 0 to 5%, |
| total iron as calculated as $Fe_2O_3$ | 0.1 to 0.9%, and |
| total tin as calculated as $SnO_2$ | 0.02 to 0.3%. |

When the $SiO_2$ content is at least 30%, the weather resistance will be good. When the $SiO_2$ content is at most 80%, devitrification hardly occurs. The $SiO_2$ content is, as represented by mass % based on oxides, preferably from 50 to 80%, more preferably from 60 to 75%, further preferably from 65 to 75%, still more preferably from 65 to 73%, particularly preferably from 67 to 71%.

$Al_2O_3$ is a component to improve the weather resistance.

When the $Al_2O_3$ content is at most 30%, the melting property will be good. The $Al_2O_3$ content is, as represented by mass % based on oxides, preferably from 0.5 to 15%, more preferably from 1 to 10%, further preferably from 3 to 5%, particularly preferably from 3.2 to 3.5%. In order that devitrification hardly occurs, it is preferably from 0 to 3%, particularly preferably from 0.3 to 3%.

$B_2O_3$ is a component to accelerate melting of the glass raw material.

When the $B_2O_3$ content is at most 20%, the softening point is less likely to be low. The $B_2O_3$ content is, as represented by mass % based on oxides, preferably from 0 to 10%, more preferably from 0 to 5%, further preferably from 0 to 1%, and it is particularly preferred that substantially no $B_2O_3$ is contained. Containing substantially no member means that the member is not contained except for inevitable impurities (the same applies hereinafter).

MgO is a component to accelerate melting of the glass raw material and to improve the weather resistance.

When the MgO content is less than 30%, devitrification hardly occurs. The MgO content is, as represented by mass % based on oxides, preferably from 0 to 20%, more preferably from 0 to 5%, further preferably from 0 to 2%, still more preferably less than 2%, and it is particularly preferred that substantially no MgO is contained. In order that devitrification hardly occurs, it is preferably from 2 to 5%, particularly preferably from 3 to 5%.

CaO is a component to accelerate melting of the glass raw material and to improve the weather resistance.

When the CaO content is at least 0.1%, the melting property and weather resistance will be good. When the CaO content is at most 30%, devitrification hardly occurs. The CaO content is, as represented by mass % based on oxides, preferably from 0.1 to 20%, more preferably from 5 to 15%, further preferably from 7 to 10%, particularly preferably from 9 to 10%.

$Na_2O$ is a component to accelerate melting of the glass raw material.

When the $Na_2O$ content is at least 0.5%, the melting property will be good. When the $Na_2O$ content is at most 50%, the weather resistance will be good. The $Na_2O$ content is, as represented by mass % based on oxides, preferably from 1 to 30%, more preferably from 5 to 25%, further preferably from 10 to 18%, still more preferably at least 11%, particularly preferably from 12 to 16%, furthermore preferably at most 15%, most preferably from 13 to 15%.

$K_2O$ is a component to accelerate melting of the glass raw material.

When the $K_2O$ content is at most 50%, the weather resistance will be good. The $K_2O$ content is, as represented by mass % based on oxides, preferably from 0 to 20%, more preferably from 0 to 10%, preferably at least 0.05%, preferably at most 5%, further preferably from 1 to 5%, particularly preferably from 1.1 to 2%, most preferably from 1.3 to 1.7%.

$Fe_2O_3$ is a coloring component.

When the content of total iron as calculated as $Fe_2O_3$ is at least 0.001%, Te can be kept low. When the content of total iron as calculated as $Fe_2O_3$ is at most 5%, the visible light transmittance of the glass will be good. The content of total iron as calculated as $Fe_2O_3$, as represented by mass % based on oxides, is preferably from 0.005 to 4%, more preferably from 0.01 to 3%, further preferably from 0.1 to 1%, still more preferably from 0.1 to 0.9%, furthermore preferably at least 0.15%, particularly preferably from 0.3 to 0.9%, most preferably from 0.6 to 0.7%.

In this specification, the content of total iron is represented as an amount of $Fe_2O_3$ in accordance with a standard method of analysis, however, as described above, not the entire iron present in glass is present as trivalent iron, and divalent iron is also present.

$SnO_2$ is a component which functions as a buffering agent for oxidation-reduction reaction of iron and sulfur.

When the content of total tin as calculated as $SnO_2$ is at least 0.001% the effect as a buffering agent can be sufficiently obtained. When the content of total tin as calculated as $SnO_2$ is at most 5%, volatilization of $SnO_2$ tends to be small, and the cost can be kept low. The content of total tin as calculated as $SnO_2$, as represented by mass % based on oxides, is preferably at least 0.02%, preferably from 0.02 to 3%, more preferably from 0.05 to 1%, further preferably from 0.1 to 0.5%, still more preferably at most 0.3%, particularly preferably from 0.15 to 0.3%, most preferably from 0.17 to 0.25%.

In this specification, the content of total tin is represented as an amount of $SnO_2$ in accordance with a standard method of analysis, however, as described above, not the entire tin present in glass is present as tetravalent tin, and divalent tin is also present.

The colored glass plate of the present invention usually contains $SO_3$ derived from salt cake ($Na_2SO_4$) contained as a refining agent in the glass raw material.

When the content of total sulfur as calculated as $SO_3$ is less than 0.025%, amber coloring can be suppressed. Further, in a case where the glass contains no $SO_3$, although amber coloring derived from salt cake is not outstanding, the refining effect at the time of melting glass tends to be poor, and bubble remaining may occur, or another operation may be required to remove bubbles, thus increasing the production cost. The content of total sulfur as calculated as $SO_3$ is preferably at least 0.005% and at most 0.02%, more preferably less than 0.02%, further preferably at least 0.010%, still more preferably from 0.010 to 0.018%, particularly preferably from 0.013 to 0.016%.

In this specification, the content of total sulfur is represented as an amount of $SO_3$ in accordance with a standard method of analysis, however, as described above, not the entire sulfur present in glass is present as hexavalent sulfur, and negative divalent sulfur is also present.

The colored glass plate of the present invention preferably contains substantially no $TiO_2$ for the purpose of adjusting the color of the transmitted light, particularly in order to obtain a blue glass plate.

The colored glass plate of the present invention preferably contains $TiO_2$ in a content of at most 3.0% as represented by mass % based on oxides, for the purpose of adjusting the color of the transmitted light particularly in order to obtain a green glass plate. $TiO_2$ is a component which provides a yellowish transmitted light, and by using it together with divalent iron which provides a bluish transmitted light in combination, a greenish transmitted light can be provided. The $TiO_2$ content is more preferably from 0.2 to 2.0%, further preferably from 0.5 to 1.0%, particularly preferably from 0.7 to 0.95%, most preferably from 0.8 to 0.92%.

The colored glass plate of the present invention may contain, as the case requires, SrO, BaO and $ZrO_2$ in a total amount of preferably at most 5%, more preferably at most 4%, further preferably at most 3%, still more preferably at most 2%, particularly preferably at most 1%. SrO and BaO are components to accelerate melting of the glass raw material. $ZrO_2$ is a component to improve the elastic modulus of glass.

The colored glass plate of the present invention may contain, for the purpose of adjusting the color of the transmitted light, as the case requires, other coloring components ($CeO_2$, $V_2O_5$, CuO, CoO, $Cr_2O_3$, NiO, Se oxide or MnO) in a total amount of preferably at most 5%, more preferably at most 4%, further preferably at most 3%.

The colored glass plate of the present invention may contain, as the case requires, $Sb_2O_3$ or $As_2O_3$ used as another refining agent.

The colored glass plate of the present invention is preferably such that the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is 1.30, particularly preferably at least 1.85, more preferably at least 1.9, further preferably at least 2.0, particularly preferably at least 2.1.

Te of the heat-absorbing glass plate of the present invention is preferably at most 65%, more preferably at most 50%, further preferably at most 40%, still more preferably at most 35%. In the present invention, Te of the heat-absorbing glass plate means the value of Te when the thickness of the heat-absorbing glass plate is calculated as 4 mm thickness, and in this specification, it may be represented simply by "calculated as 4 mm thickness". Te is the solar transmittance calculated by measuring the transmittance by a spectrophotometer in accordance with JIS R3106 (1998) (hereinafter referred to simply as JIS R3106).

Tv of the heat-absorbing glass plate of the present invention is preferably at least 60%, more preferably at least 65%, further preferably at least 70%. In the present invention, Tv of the heat-absorbing glass plate means the value of Tv when the thickness of the heat-absorbing glass plate is calculated as 4 mm thickness, and in this specification, it may be represented simply by "calculated as 4 mm thickness". Tv is the visible light transmittance calculated by measuring the transmittance by a spectrophotometer in accordance with JIS R3106. The coefficient is a value of the 2 degree field of view with illuminant A.

The colored glass plate of the present invention can be used either for vehicles and for building, and is particularly suitable as a windshield of an automobile. When it is used as window glass for an automobile, as the case requires, it is formed into laminated glass having an interlayer sandwiched between a plurality of glass plates, glass having flat glass processed to have a curved surface, or tempered glass. Further, when it is used as double glazing for building, it is used as double glazing comprising two sheets of the colored glass plates of the present invention or as double glazing of the colored glass plate of the present invention and another glass plate.

The colored glass plate of the present invention is produced, for example, by means of a known forming method such as a float process or a fusion process (down draw method).

The colored glass plate of the present invention is produced, for example, by means of the following steps (i) to (v).

(i) A glass matrix material such as silica sand, coloring component materials such as an iron source and a titanium source, a reducing agent, a refining agent and the like are mixed to achieve the desired glass composition to prepare a glass raw material.

(ii) The glass raw material is continuously supplied to a melting furnace, heated to about 1,500° C. by burning heavy oil, natural gas or the like, and melted to form molten glass.

The molten glass is refined as then formed into a glass plate having a predetermined thickness e.g. by a float process.

v) The glass plate is annealed and cut into a predetermined size to obtain a colored glass plate of the present invention.

(v) As the case requires, the cut glass plate may be tempered, may be formed into laminated glass, or may be formed into double glazing.

The glass matrix material may be one used as a material of conventional silica glass (soda lime silica glass) containing an alkali, such as silica sand.

The iron source may, for example, be iron powder, iron oxide powder or red iron oxide.

The titanium source may, for example, be titanium oxide.

The reducing agent may, for example, be coke. The reducing agent is to suppress oxidation of iron in the molten glass and to adjust Fe-Redox to a desired level.

The above-described colored glass plate of the present invention contains tin and has Sn-Redox of at least 0.1%, and accordingly tin functions as a buffering agent for oxidation-reduction reaction of iron and sulfur. Accordingly, Fe-Redox can be stably maintained at a high level while amber coloring by divalent sulfur is suppressed. Further, by adjusting β-OH to at least 0.15 $mm^{-1}$, a colored glass plate having less bubbles regardless of a small amount of total sulfur as calculated as $SO_3$ can be obtained.

EXAMPLES

Now, the present invention will be described in detail with reference to Examples. However, it should be understood that the present invention is by no means restricted to such specific Examples.

Ex. 1 to 16 and 19 to 22 are Examples of the present invention, and Ex. 17 and 18 are Comparative Examples (Fe-Redox)

With respect to the obtained glass plate, Fe-Redox was calculated from the transmittance measured by a spectrophotometer (Lambda950 manufactured by PerkinElmer Co., Ltd.).

(Sn-Redox)

With respect to the obtained glass plate, Sn-Redox was calculated from the contents of divalent tin and tetravalent tin in glass measured at room temperature by the following Sn-Mössbauer spectroscopy.

(Sn-Mössbauer Spectroscopy)

The ratio of presence of divalent tin and tetravalent tin (Sn-Redox) in a sample was measured by transmittance method (measuring γ-rays which had been transmitted through the glass sample) using as a probe γ rays (23.8 keV) generated along with energy transition from $^{119m}Sn$ to $^{119}Sn$, specifically as follows.

A γ-ray outgoing port of a radiation source, a glass sample, a Pd filter and a photodetecting portion of a gas amplification proportional counter (manufactured by LND, Inc., model: 45431) were disposed on a straight line with a length of from 300 to 800 mm.

As the radiation source, 10 mCi of $^{119m}Sn$ was employed, the radiation source was moved in the axial direction of the optical system, to cause an energy change of γ-rays by the Doppler effect. The rate of the radiation source was adjusted by using a transducer (manufactured by TOYO KEIKI CO., LTD.) so that vibration occurs at a rate of from −10 to +10 mm/sec in the axial direction of the optical system.

As the glass sample, a glass plate prepared by polishing the obtained glass plate to a thickness of from 3 to 7 mm was used.

The Pd filter is to improve the measurement accuracy of γ-rays by the gas amplification proportional counter and is a Pd foil having a thickness of 50 mm which removes characteristic X-rays generated from the glass sample when irradiated with γ-rays.

The gas amplification proportional counter is to detect γ-rays. Electric signals indicating the amount of γ rays from the gas amplification proportional counter were amplified by an amplifier (manufactured by Kansai Electronics Co., Ltd.) and detected light signals were detected. The gas amplification proportional counter was interlocked with the above rate information by a multichannel analyzer (CMCA550 manufactured by Wissel).

By plotting the detected signals from the gas amplification proportional counter on the vertical axis and the rate of the moving radiation source on the horizontal axis, a spectrum can be obtained (Mössbauer spectroscopy-Its Basis and Applications, Hirotoshi Sano and Motomi Katada, Business Center for Academic Societies Japan, pages 45 to 64). The elapsed time was 2 days to 16 days until an assessable signal-to-noise ratio was obtained.

A peak which appears in the vicinity of 0 mm/sec represents presence of tetravalent tin, and two split peaks which appear in the vicinity of 2.5 mm/sec and 4.5 mm/sec indicate presence of divalent tin. The proportion of a product of each peak area and the correction coefficient (tetravalent tin: 0.22, divalent tin: 0.49) (Darja Benner et al, "The effect of alumina on the $Sn^{2+}/Sn^{4+}$ redox equilibrium and the incorporation of tin in $Na_2O/Al_2O_3/SiO_2$ melts", Journal of Non-Crystalline Solids, 337, 2004, pages 232 to 240) was calculated to calculate Sn-Redox.

(Tv)

With respect to the obtained glass plate, the visible light transmittance (Tv) (by illuminant A) as defined in JIS R3106 was obtained as a value calculated as 4 mm thickness.

(Te)

With respect to the obtained glass plate, the solar transmittance (Te) as defined in JIS R3106 was obtained as a value calculated as 4 mm thickness.

(Measurement of β-OH)

With respect to the obtained glass plate, β-OH was calculated in accordance with the following formula from an infrared absorption spectral curve of glass measured by FT-IR.

$$\beta\text{-OH (mm}^{-1}) = -\log_{10}(T_{3500} \text{ cm}^{-1}/T_{4000} \text{ cm}^{-1})/t$$

In the above formula, $T_{3500}$ cm$^{-1}$ is the transmittance (%) at a wave number of 3,500 cm$^{-1}$, $T_{4000}$ cm$^{-1}$ is the transmittance (%) at a wave number of 4,000 cm$^{-1}$, and t is the thickness (mm) of the glass plate.

(Index to Number of Bubbles in Glass Plate)

With respect to the obtained glass plate, Fe-Redox and β-OH were calculated, and the index to the number of bubbles in the glass plate was calculated in accordance with the following formula.

Index to number of bubbles in glass plate=443−420×β-OH (mm$^{-1}$)−4.8×Fe-redox (%)

Ex. 1 to 22

The glass matrix material such as silica sand, coke, an iron source, $SnO_2$ and salt cake ($Na_2SO_4$) were mixed to achieve compositions as identified in Tables 1 to 3 to prepare glass raw materials. Each glass raw material was put into a crucible and heated at 1,500° C. for 2 hours to form molten glass. β-OH was controlled by blowing water vapor into the molten glass. The molten glass was cast on a carbon plate and cooled. Both surfaces of the glass were polished to obtain a glass plate having a thickness of 4 mm. With respect to the glass plate, Fe-Redox, Sn-Redox and β-OH were obtained. The results are shown in Tables 1 to 3.

In "composition" in Tables 1 to 3, $Fe_2O_3$ represents the amount of total iron, $SnO_2$ represents the amount of total tin, and $SO_3$ represents the amount of total sulfur. Further, numerical values in brackets in Table 3 represent calculated values.

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Composition (%) | $SiO_2$ | 70.7 | 70.7 | 70.6 | 70.7 | 70.7 | 70.7 | 70.7 | 70.5 | 70.3 |
| | $Al_2O_3$ | 3.4 | 3.4 | 3.3 | 3.2 | 3.3 | 3.2 | 3.3 | 3.3 | 3.3 |
| | MgO | 0.0 | 0.0 | 0.0 | 0.1 | 0.1 | 0.1 | 0.1 | 0.1 | 0.1 |
| | CaO | 9.5 | 9.5 | 9.5 | 9.4 | 9.4 | 9.5 | 9.5 | 9.5 | 9.5 |
| | $Na_2O$ | 13.9 | 14.0 | 14.1 | 14.2 | 14.2 | 14.2 | 14.1 | 14.3 | 14.2 |
| | $K_2O$ | 1.6 | 1.6 | 1.6 | 1.5 | 1.5 | 1.5 | 1.5 | 1.5 | 1.5 |
| | $Fe_2O_3$ | 0.66 | 0.66 | 0.68 | 0.65 | 0.67 | 0.66 | 0.66 | 0.65 | 0.57 |
| | $TiO_2$ | 0.02 | 0.02 | 0.02 | 0.01 | 0.01 | 0.01 | 0.01 | 0.01 | 0.33 |
| | $SnO_2$ | 0.19 | 0.19 | 0.19 | 0.19 | 0.20 | 0.20 | 0.20 | 0.19 | 0.21 |
| | $SO_3$ | 0.006 | 0.007 | 0.009 | 0.015 | 0.015 | 0.012 | 0.018 | 0.020 | 0.021 |
| Fe-redox (%) | | 61 | 66 | 67 | 72 | 72 | 77 | 68 | 60 | 63 |
| Sn-redox (%) | | 0.2 | 0.2 | 1.1 | 5.6 | 3.3 | 5.9 | 3.1 | 0.7 | 11.0 |
| β-OH (mm$^{-1}$) | | 0.28 | 0.26 | 0.27 | 0.26 | 0.27 | 0.26 | 0.27 | 0.36 | 0.28 |
| Index to number of bubbles in glass plate | | 31 | 15 | 9 | −12 | −17 | −34 | 3 | 7 | 20 |
| Tv (%) | | 68.4 | 66.8 | 66.0 | 64.6 | 64.5 | 61.5 | 66.6 | 68.8 | 69.8 |
| Te (%) | | 33.4 | 31.8 | 30.9 | 29.8 | 29.7 | 26.8 | 31.6 | 33.9 | 34.9 |
| Tv/Te | | 2.05 | 2.10 | 2.14 | 2.17 | 2.17 | 2.30 | 2.11 | 2.03 | 2.00 |

TABLE 2

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| $SiO_2$ | 70.2 | 70.1 | 70.1 | 69.9 | 70.7 | 70.7 | 71.2 | 70.6 | 70.7 |
| $Al_2O_3$ | 3.3 | 3.3 | 3.3 | 3.3 | 3.3 | 3.3 | 3.4 | 3.2 | 3.3 |
| MgO | 0.1 | 0.1 | 0.1 | 0.1 | 0.1 | 0.1 | 0.0 | 0.1 | 0.1 |
| CaO | 9.5 | 9.4 | 9.4 | 9.4 | 9.3 | 9.3 | 9.5 | 9.5 | 9.5 |
| $Na_2O$ | 14.1 | 14.1 | 14.0 | 14.0 | 14.3 | 14.3 | 13.9 | 14.2 | 14.2 |
| $K_2O$ | 1.5 | 1.5 | 1.5 | 1.5 | 1.5 | 1.5 | 1.6 | 1.5 | 1.5 |
| $Fe_2O_3$ | 0.49 | 0.39 | 0.67 | 0.73 | 0.67 | 0.66 | 0.20 | 0.65 | 0.65 |
| $TiO_2$ | 0.60 | 0.80 | 0.71 | 0.84 | 0.01 | 0.01 | 0.02 | 0.01 | 0.01 |
| $SnO_2$ | 0.21 | 0.21 | 0.21 | 0.21 | 0.10 | 0.05 | 0.19 | 0.20 | 0.20 |
| $SO_3$ | 0.022 | 0.023 | 0.014 | 0.014 | 0.013 | 0.015 | 0.006 | 0.021 | 0.016 |
| Fe-redox (%) | 61 | 62 | 59 | 62 | 62 | 60 | 61 | 61 | 57 |
| Sn-redox (%) | 1.8 | 0.4 | 14.1 | 14.1 | 0.3 | 1.6 | 0.2 | Not measured | 12.1 |
| β-OH (mm$^{-1}$) | 0.28 | 0.28 | 0.26 | 0.27 | 0.30 | 0.25 | 0.28 | 0.11 | 0.14 |
| Index to number of bubbles in glass plate | 29 | 27 | 50 | 32 | 19 | 50 | 31 | 103 | 110 |
| Tv (%) | 72.1 | 75.2 | 65.1 | 62.2 | 68.0 | 68.3 | 83.1 | 68.2 | 67.6 |
| Te (%) | 37.7 | 42.3 | 30.9 | 28.0 | 33.1 | 33.4 | 57.7 | 33.5 | 32.8 |
| Tv/Te | 1.91 | 1.78 | 2.11 | 2.22 | 2.05 | 2.04 | 1.44 | 2.04 | 2.06 |

TABLE 3

|  |  | Ex. 19 | Ex. 20 | Ex. 21 | Ex. 22 |
|---|---|---|---|---|---|
| Composition (%) | SiO2 | 69.7 | 69.7 | 72.4 | 72.4 |
|  | Al2O3 | 3.5 | 3.5 | 0.45 | 0.45 |
|  | MgO | 0.33 | 0.33 | 4.2 | 4.2 |
|  | CaO | 9.6 | 9.6 | 8.9 | 8.9 |
|  | Na2O | 14.6 | 14.6 | 13.4 | 13.4 |
|  | K2O | 1.5 | 1.5 | 0.090 | 0.090 |
|  | CeO2 | 0.30 | 0.30 | 0.090 | 0.090 |
|  | TiO2 | 0.00 | 0.00 | 0.00 | 0.00 |
|  | Fe2O3 | 0.25 | 0.32 | 0.20 | 0.25 |
|  | SnO2 | 0.22 | 0.22 | 0.22 | 0.22 |
|  | CoO | 0.00015 | 0.00020 | 0.00020 | 0.00015 |
|  | Se | 0.00060 | 0.00050 | 0.00070 | 0.00065 |
|  | SO3 | 0.0050 | 0.005 | 0.005 | 0.005 |
| Fe-redox (%) |  | 62.0 | 62.0 | 62.0 | 62.0 |
| Sn-redox (%) |  | (0.5) | (0.5) | (0.5) | (0.5) |
| β-OH (mm$^{-1}$) |  | 0.23 | 0.25 | 0.25 | 0.23 |
| Index to number of bubbles in glass plate |  | 49 | 40 | 40 | 49 |
| Tv (%) |  | (74.8) | (72.3) | (77.0) | (76.7) |
| Te (%) |  | (50.5) | (45.0) | (55.9) | (51.8) |
| Tv/Te |  | 1.48 | 1.61 | 1.38 | 1.48 |

With respect to the colored glass plates of the present invention in Ex. 1 to 16 and 19 to 22 which are Examples of the present invention, Sn-Redox was higher than 0.1%, Fe-Redox was maintained at a high level, amber coloring was suppressed, β-OH was at least 0.15 mm$^{-1}$ and accordingly the index to the number of bubbles in the glass plate was less than 100, and the amount of gas bubbles contained in the glass plate was small.

With respect to the glass plates in Ex. 17 and 18 which are Comparative Examples, β-OH was low, the index to the number of bubbles in the glass plate was higher than 100, and the number of bubbles in the glass plate prepared in a glass melting furnace was large.

INDUSTRIAL APPLICABILITY

The colored glass plate of the present invention is useful as a glass plate for vehicles and for buildings, and is particularly suitable as a heat-absorbing glass plate for buildings.

This application is a continuation of PCT Application No. PCT/JP2015/062389 filed on Apr. 23, 2015, which is based upon and claims the benefit of priority from Japanese Patent Application No. 2014-089595 filed on Apr. 23, 2014. The contents of those applications are incorporated herein by reference in their entireties.

What is claimed is:

1. A colored glass plate, comprising an alkali-containing silica glass comprising iron, tin and sulfur, wherein, as represented by mass % based on oxides:
   the proportion of $Na_2O$ is from 0.5 to 50%,
   the proportion of total sulfur as calculated as $SO_3$ is from 0.005 to less than 0.025%,
   the proportion of divalent iron as calculated as $Fe_2O_3$ to total iron as calculated as $Fe_2O_3$ is at least 45%,
   the proportion of divalent tin as calculated as $SnO_2$ to total tin as calculated as $SnO_2$ is at least 0.1% as represented by mol %, and
   wherein β-OH is at least 0.15 mm$^{-1}$.

2. The colored glass plate according to claim 1, wherein the proportion of divalent tin as calculated as $SnO_2$ to total tin as calculated as $SnO_2$ is at least 1% as represented by mol %.

3. The colored glass plate according to claim 1, wherein the proportion of divalent tin as calculated as $SnO_2$ to total tin as calculated as $SnO_2$ is from 0.2 to 40% as represented by mol %.

4. The colored glass plate according to claim 1, wherein the proportion of divalent iron as calculated as $Fe_2O_3$ to total iron as calculated as $Fe_2O_3$ is at least 55%.

5. The colored glass plate according to claim 1, wherein the proportion of divalent iron as calculated as $Fe_2O_3$ to total iron as calculated as $Fe_2O_3$ is at least 60%.

6. The colored glass plate according to claim 1, wherein the proportion of total sulfur as calculated as $SO_3$ as represented by mass % based on oxides is at least 0.01% and less than 0.02%.

7. The colored glass plate according to claim 1, wherein the proportion of total sulfur as calculated as $SO_3$ as represented by mass % based on oxides is from 0.010% to less than 0.025%.

8. The colored glass plate according to claim 1, which contains substantially no $TiO_2$.

9. The colored glass plate according to claim 1, comprising $TiO_2$, and having a $TiO_2$ content of at most 3.0% as represented by mass % based on oxides.

10. The colored glass plate according to claim 1, wherein the proportion of MgO as represented by mass % based on oxides is less than 2%.

11. The colored glass plate according to claim 1, which contains, as represented by mass % based on oxides:

| $SiO_2$ | 30 to 80%, |
|---|---|
| $Al_2O_3$ | 0 to 30% |
| $B_2O_3$ | 0 to 20%, |
| MgO | 0 to 30%, |
| CaO | 0 to 30%, |
| $Na_2O$ | 0.5 to 50%, |
| $K_2O$ | 0 to 50%, |
| total iron as calculated as $Fe_2O_3$ | 0.001 to 5%, and |
| total tin as calculated as $SnO_2$ | 0.001 to 5%. |

12. The colored glass plate according to claim 1, which contains, as represented by mass % based on oxides:

| $SiO_2$ | 65 to 73%, |
|---|---|
| $Al_2O_3$ | 3 to 5% |
| $B_2O_3$ | 0 to 1%, |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.1 to 0.9%, and |
| total tin as calculated as $SnO_2$ | 0.02 to 0.3%. |

13. The colored glass plate according to claim 1, which contains substantially no $B_2O_3$ and contains, as represented by mass % based on oxides:

| $SiO_2$ | 65 to 73%, |
|---|---|
| $Al_2O_3$ | 3 to 5% |
| MgO | at least 0% and less than 2%, |
| CaO | 7 to 10%, |
| $Na_2O$ | 12 to 16%, |
| $K_2O$ | 1 to 5%, |
| total iron as calculated as $Fe_2O_3$ | 0.3 to 0.9%, and |
| total tin as calculated as $SnO_2$ | 0.02 to 0.3%. |

14. The colored glass plate according to claim 1, which contains, as represented by mass % based on oxides:

| | |
|---|---|
| SiO$_2$ | 65 to 75%, |
| Al$_2$O$_3$ | 0 to 3% |
| B$_2$O$_3$ | 0 to 1%, |
| MgO | 2 to 5%, |
| CaO | 7 to 10%, |
| Na$_2$O | 11 to 15%, |
| K$_2$O | 0 to 5%, |
| total iron as calculated as Fe$_2$O$_3$ | 0.1 to 0.9%, and |
| total tin as calculated as SnO$_2$ | 0.02 to 0.3%. |

15. The colored glass plate according to claim 1, wherein 443−420×β-OH (mm$^{-1}$)−4.8×Fe-redox (%) is less than 100.

16. The colored glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 1.3.

17. The colored glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 1.85.

18. The colored glass plate according to claim 1, wherein the solar transmittance Te is at most 65% calculated as 4 mm thickness of the glass plate as defined in JIS R3106 (1998), and the visible light transmittance Tv (by illuminant A, 2° visual field) is at least 60% calculated as 4 mm thickness of the glass plate as defined in JIS R3106 (1998).

19. The colored glass plate according to claim 1, wherein the solar transmittance Te is at most 50% calculated as 4 mm thickness of the glass plate as defined in JIS R3106 (1998), and the visible light transmittance Tv (by illuminant A, 2° visual field) is at least 60% calculated as 4 mm thickness of the glass plate as defined in JIS R3106 (1998).

20. A process for producing a colored glass plate, which comprises melting a glass raw material, followed by forming to produce soda lime silica glass, wherein the glass after the forming is the colored glass plate as defined in claim 1.

* * * * *